US009451191B2

(12) United States Patent
Guicquero et al.

(10) Patent No.: US 9,451,191 B2
(45) Date of Patent: Sep. 20, 2016

(54) COMPRESSIVE IMAGE SENSING DEVICE AND METHOD

(71) Applicant: COMMISSARIAT A L'ENERGIE ATOMIQUE ET AUX ENERGIES ALTERNATIVES, Paris (FR)

(72) Inventors: William Guicquero, Bures sur Yvette (FR); Antoine Dupret, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 28 days.

(21) Appl. No.: 14/481,723

(22) Filed: Sep. 9, 2014

(65) Prior Publication Data

US 2015/0070555 A1    Mar. 12, 2015

(30) Foreign Application Priority Data

Sep. 10, 2013  (FR) ..................................... 13 58674
Sep. 8, 2014   (EP) ..................................... 14183982

(51) Int. Cl.
H04N 5/3745   (2011.01)
H04N 5/335    (2011.01)

(52) U.S. Cl.
CPC ............ *H04N 5/3745* (2013.01); *H04N 5/335* (2013.01)

(58) Field of Classification Search
CPC .................................................... H04N 5/3745
USPC .............................. 348/308, 207.99; 382/251
See application file for complete search history.

(56) References Cited

U.S. PATENT DOCUMENTS

| 2006/0104531 A1* | 5/2006 | Smith ................... H04N 19/15 382/251 |
| 2010/0053352 A1 | 3/2010 | Dekel |
| 2011/0315855 A1 | 12/2011 | Perlman et al. |
| 2013/0011051 A1 | 1/2013 | Bottisti et al. |

FOREIGN PATENT DOCUMENTS

| WO | 2011103601 A2 | 2/2011 |
| WO | 2012044380 A2 | 6/2011 |

OTHER PUBLICATIONS

Jaques, et al., "CMOS Compressed Imagery by Random Convolution", ICASSP, 1113-1116, (2009).
Robucci, et al., "Compressive Sensing on a CMOS Separable-Transform Image Sensor", Proceedings of the IEEE, vol. 98, No. 6, 1089-1101, (May 19, 2010).
Blumensath, "Compressed Sensing with Nonlinear Observations and Related Nonlinear Optimisation Problems", University of Oxford, Centre for Functional Magnetic Resonance Imaging of the Brain, J R Hospital, Oxford, OX3 9DU, UK, (May 9, 2012).
Duarte, et al., "Single-Pixel Imaging via Compressive Sampling." (Dec. 9, 2009).

(Continued)

*Primary Examiner* — Joel Fosselman
(74) *Attorney, Agent, or Firm* — Kevin R. Erdman; Brannon Sowers & Cracraft PC

(57) ABSTRACT

A CMOS image sensor including: a plurality of pixels; a first analog circuit for calculating one or a plurality of statistical estimators based on the analog output values of sensor pixels; and a second circuit capable of implementing a compressive image sensing method, wherein the applied compression rate is a function of the statistical estimator(s) calculated by the first circuit.

20 Claims, 2 Drawing Sheets

(56) References Cited

OTHER PUBLICATIONS

Wang, et al., "Block Adaptive Compressed Sensing of SAR Images Based on Statistical Character", School of Electronics and Information Engineering, BeiHang University, 100191, Beijing, China, 640-643, (2011).

Tang, et al., "A Low Power Linear Output Current-Mediated CMOS Imager", 1st Int'l Symposium on Quality Electronic Design-Asia, 284-287, (2009).

Dadkhah, et al., "Block-Based Compressive Sensing in a CMOS Image Sensor", IEEE, (2011).

Tang, et al., "A 4T Low-Power Linear-Output Current-Mediated CMOS Image Sensor", IEEE Transactions on Very Large Scale Integration (VLSI) Systems, vol. 19, No. 9, 1559-1568 (Sep. 2011).

Majidzadeh, et al., "A (256×256) Pixel 76.7mW CMOS Imager/Compressor Based on Real-Time In-Pixel Compressive Sensing." (Feb. 12, 2010).

Ohlsson, et al., "A Nonlinear Extension of Compressive Sensing", Dept. of Electrical Engineering & Computer Sciences, University of California, Berkeley, USA. (Apr. 28, 2013).

Search Report for French Application 13/58674 filed Sep. 10, 2013, "Institut National de la Propriete Industrielle" (May 12, 2014).

* cited by examiner

COMPRESSIVE IMAGE SENSING DEVICE AND METHOD

This application claims the priority benefit of French Patent application number 13/58674, filed on Sep. 10, 2013, the disclosures and contents of which are hereby incorporated by reference in its entirety to the maximum extent allowable by law.

BACKGROUND OF THE INVENTION

The present disclosure generally relates to CMOS image sensors, and more specifically aims at a CMOS image sensor capable of implementing compressive sensing methods.

A CMOS image sensor generally comprises a plurality of pixels arranged in rows and in columns. Each pixel comprises a photodiode used in reverse mode, having its junction capacitor discharged by a photocurrent according to a received light intensity. The illumination level received by a pixel is measured by measurement of a quantity representative of the voltage across the photodiode at selected times, including the end of a period, called integration period, before and after which the pixel is reset by recharging of its photodiode.

Conventionally, in an image acquisition phase, for each pixel of the sensor, an output value representative of the illumination level received by the pixel during the integration is read, digitized, and stored in digital form. To decrease the quantity of digital data to be stored/processed downstream of the sensor, the acquisition phase is often followed by a phase of compressing the digitized image.

This conventional method of acquiring an entire digitized image, followed by a phase of compressing the digitized image, has several disadvantages. In particular, acquiring an entire digitized image is relatively long, which is a limit to the increase of image acquisition rates. Further, such an acquisition of an entire digitized image results in a relatively high electric power consumption by the read and analog-to-digital conversion circuits of the sensor. Further, the phase of compressing the digitized image may be relatively long and complex, and implies providing a digital signal processing unit dedicated to such a compression at the sensor output, possibly on the same chip as the sensor. These various disadvantages particularly raise an issue in systems with significant constraints relative to the acquisition and the compression of images in terms of processing speed and/or of electric power consumption.

To attempt overcoming all or part of these disadvantages, so-called compressive sensing methods have already been provided, where the compression phase is implemented in analog mode, upstream of the analog-to-digital converter(s), in combination with the acquisition phase.

Some of the compressive sensing methods, which will be called pixel binning compressive sensing methods, enable to acquire and to simultaneously compress the image by providing, instead of reading and digitizing an output value representative of an illumination level individually received by each pixel, to make a plurality of non-coherent measurements, each based on a measurement support comprising a plurality of sensor pixels, for example, all the sensor pixels, or a subset of sensor pixels. Each measurement is a weighted sum of the brightness levels received by the different pixels of a measurement support. The weighting coefficients are randomly or pseudo-randomly generated. Such coefficients may be binary (0 or 1), which makes the implementation of the weighted sum operations easier. On acquisition of an image, a plurality of measurements with different sets of weighting coefficients are generally provided on a same measurement support, it being understood that, to obtain a compressive effect, the total number of measurements performed on the sensor should be smaller than the number of sensor pixels. It is thus possible to decrease the image acquisition time and the electric power consumption associated with the acquisition, particularly due to the fact that less data are read and digitized by the sensor. Further, digital compressive processing operations, subsequent to the acquisition, may be decreased or suppressed.

The original image can be reconstructed from the compressed image and the array of weighting coefficients used on acquisition. Such a reconstruction uses the sparseness of the original image in a specific decomposition base, for example, in a discrete cosine base or in a wavelet base.

Theories of compressive sensing with a pixel binning have been discussed in detail in various publications, for example, in article "An Introduction To Compressive Sensing" by Emmanuel J. Candès et al.

Further, CMOS image sensor architectures using pixel binning compressive sensing have been described in articles "Block-Based Compressive Sensing in a CMOS Image Sensor", by M. R. Dadkhah et al., and "CMOS Image Sensor With Per-Column $\Sigma\Delta$ ADC and Programmable Compressed Sensing" by Yusuke Oike et al.

Other compressive sensing methods, which will be called methods of compressive sensing with no pixel binning, enable to simultaneously acquire and compress the image by providing, instead of reading and digitizing an output value representative of an illumination level received by each sensor pixel, randomly or pseudo-randomly selecting a number of pixels on the sensor, and only reading and digitizing the output values of the selected pixels. Unlike pixel binning compressive sensing, the values of the selected pixels are here individually read and digitized (without being added to other pixel values). The compression rate then is the ratio of the number of pixels selected in read mode during the acquisition to the total number of sensor pixels.

The original image can be reconstructed from the compressed image, provided to know the positions, in the sensor pixel array, of the pixels selected in read mode during the acquisition. As in the case of pixel binning compressive sensing, the reconstruction uses the sparseness of the original image in a specific decomposition base. Such a reconstruction may be carried out by methods identical or similar to those used in pixel binning compressive sensing.

An example of a system implementing a compressive sensing with no pixel binning is disclosed in article "Chaotic Scan: A Low Complexity Video Transmission System for Efficiently Sending Relevant Image Features", by R. Dogaru et al.

It should be noted that in the field of compressive sensing (with or without pixel binning), the use of pseudo-random generators, that is, generators having a predictive behavior, has the advantage of enabling, at the time of the reconstruction of the original image, to generate for a second time the non-coherent binary values used in the acquisition—as weighting coefficients in the case of a pixel binning compressive sensing —or as a mask for selecting the pixels to be read from in the case of a compressive sensing without pixel binning. The original image can thus be reconstructed without having to transmit, with the compressed image, the non-coherent binary values used during the sensing.

There is a need for a CMOS image sensor capable of implementing compressive sensing methods, such a sensor at least partly improving certain aspects of prior art sensors using compressive sensing. In particular, there is a need for a CMOS sensor providing, for each equivalent image quality, a better compression rate than prior art sensors using compressive sensing or, for an equivalent compression rate, a better image quality than prior art sensors using compressive sensing.

SUMMARY

Thus, an embodiment provides a CMOS image sensor comprising: a plurality of pixels; a first analog circuit for calculating one or a plurality of statistical estimators based on analog output values of pixels of the sensor; and a second circuit capable of implementing a compressive image sensing method, the method comprising acquiring output values based on the output values of a pseudo-random selection of one or a plurality of sensor pixels, wherein the applied compression rate is a function of the statistical estimators calculated by the first circuit.

According to an embodiment, the pixels are distributed into a plurality of blocks of pixels, and the compression rate is adapted block by block according to the statistical estimator(s) calculated by the first circuit.

According to an embodiment, in each block, one or a plurality of statistical estimators based on the output values of the pixels in the block are calculated by the first circuit, and the compression rate of the block is a function of the statistical estimator(s) calculated for the block.

According to an embodiment, the second circuit comprises an array of switched capacitors.

According to an embodiment, the second circuit comprises one or a plurality of analog statistical estimator calculation operators.

According to an embodiment, the compressive sensing method is a method of compressive sensing with no pixel binning; the second circuit comprises a circuit for generating pseudo-random binary values having a controllable output expectation; and the compression rate is adjusted by varying the output expectation of the pseudo-random binary value generation circuit.

According to an embodiment, the circuit for generating pseudo-random binary values having a controllable output expectation comprises a generator of pseudo-random binary values having a fixed output expectation, and an expectation adaptation stage.

According to an embodiment, the generator comprises an array of delay cells.

According to an embodiment, the expectation adaptation stage comprises a plurality of expectation adaptation cells each receiving a plurality of pseudo-random binary signals having a fixed output expectation delivered by the generator, and implementing an expectation adaptation function which takes into account a control signal representative of one or a plurality of statistical estimators calculated by the first circuit.

According to an embodiment, the control signal is a quantized variance value.

According to an embodiment, the compressive sensing method is a pixel binning compressive sensing method; and the compression rate is adjusted by varying the number of compressive sensing measurements performed on each measurement support of the image.

According to an embodiment, the statistical estimator(s) are selected from the group comprising the mean, the variance, the asymmetry coefficient, the kurtosis, and statistical moments of an order greater than 4.

According to an embodiment, the pixels are arranged in an array.

According to an embodiment, the statistical estimator(s) calculated by the first circuit are digitized and transmitted in the compressed image.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
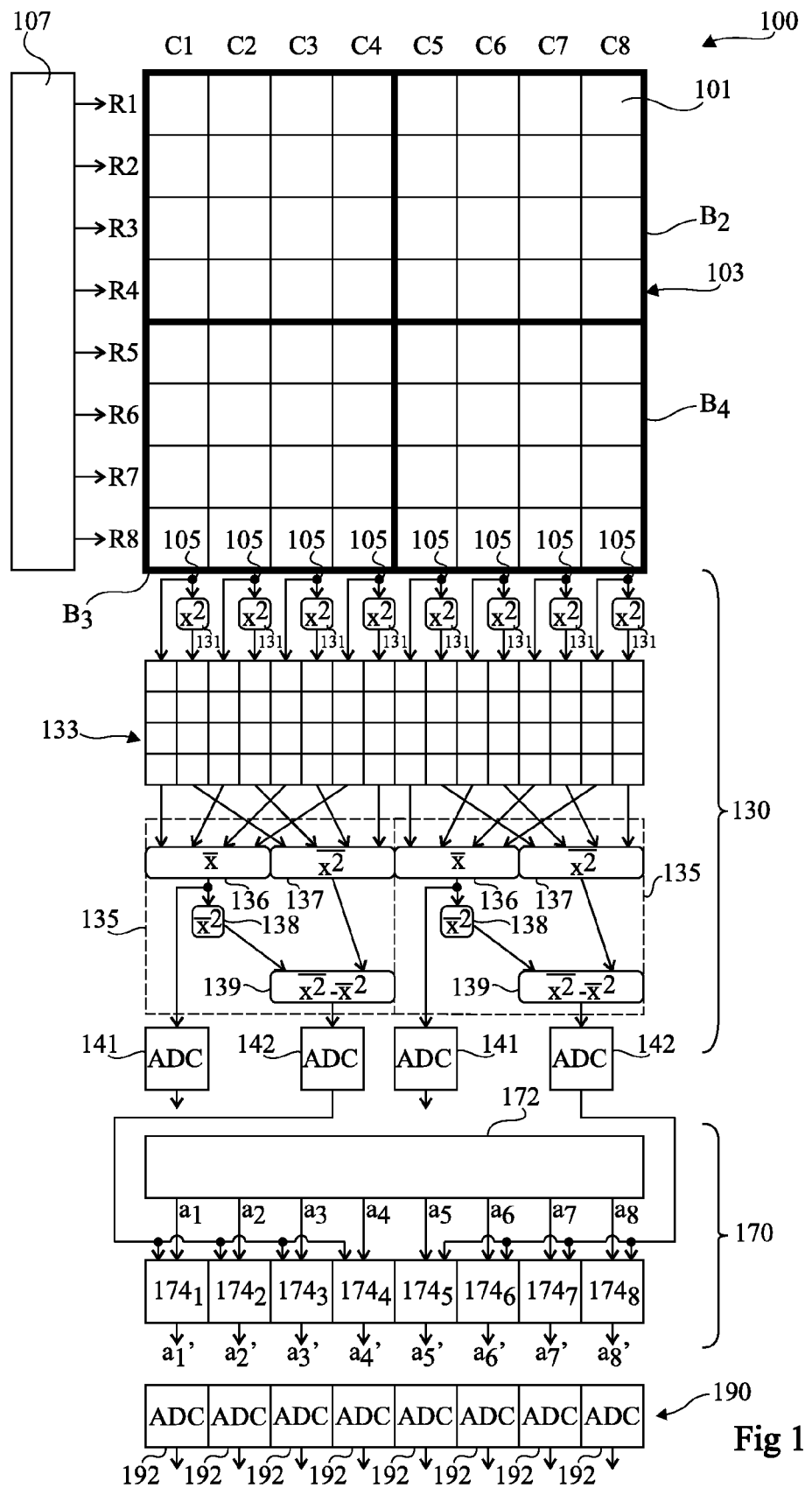
FIG. 1 schematically shows in the form of blocks an embodiment of a CMOS image sensor capable of implementing compressive sensing methods.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

For clarity, the same elements have been designated with the same reference numerals in the different drawings. Further, only those elements which are useful to the understanding of the embodiments described hereafter have been detailed. In particular, the methods and devices capable of being used to reconstruct non-compressed images from images captured in compressive sensing have not been detailed, the embodiments of compressive sensing devices and methods described hereafter being compatible with usual reconstruction methods and devices in compressive sensing.

According to an aspect of the embodiments described hereafter, a CMOS image sensor is provided, which comprises:

a plurality of pixels;

circuits capable of calculating, in analog mode, that is, upstream of one or a plurality of analog-to-digital converters of the sensor, one or a plurality of statistical or pseudo-statistical estimators each based on the output values, either of all the sensor pixels, or of a subset of sensor pixels; and circuits for implementing a compressive sensing method, where the number of values read, digitized, and transmitted in the final image during the compressive sensing depends on the statistical estimator(s) calculated for the image, to adapt the image compression rate according to these estimators.

The calculated statistical estimators are for example statistical moments such as the mean (moment of order 1) and/or the variance (moment of order 2) and/or the asymmetry coefficient (moment of order 3) and/or the kurtosis (moment of order 4) and/or moments of an order greater than 4. Statistical estimators other than moments may be used, for example, the total variation, or any other pseudo-statistical estimator based on the combination of a convex function and/or of a concave function. More generally, any statistical or pseudo-statistical estimator representative of the degree of sparseness of the image or of a portion of the image may be used.

FIG. 1 schematically shows in the form of blocks a preferred embodiment of a CMOS image sensor 100 capable of implementing compressive sensing methods. It should be noted that in this example, sensor 100 is capable of implementing not only compressive sensing methods, but also methods of acquisition of an entire non-compressed image.

In the embodiment of FIG. 1, sensor 100 is capable of implementing methods of compressive sensing with no pixel binning. It comprises a pseudo-random binary value generator used to non-coherently select pixels to be read, digitized, and transmitted in the compressed image in a compressive sensing. According to an aspect of the embodiment of FIG. 1, the output expectation of the pseudo-random generator depends one or a plurality of statistical estimators calculated for the image being acquired. More particularly, it may be provided to decrease the output expectation of the generator—and thus to increase the compression rate—when the image has a high degree of sparseness, and to increase the generator output expectation—and thus decrease the compression rate—when the image has a low degree of sparseness.

Sensor 100 comprises a plurality of identical pixels 101 arranged in an array 103. In the example of FIG. 1, given for explanation purposes, array 103 comprises 8 rows bearing references R1 to R8 (from top to bottom in the orientation of the drawing) and 8 columns bearing references C1 to C8 (from left to right in the orientation of the drawing), that is, 64 pixels. The embodiments described hereafter are of course compatible with arrays having different dimensions and, more generally, with other pixel arrangements, particularly non-array arrangements.

Pixels 101 of sensor 100 are preferably active pixels, that is, they each comprise a photodetector and an active output amplifier based on MOS transistors. This enables to acquire images having a low noise with respect to a sensor with passive pixels, that is, a sensor where each pixel comprises a photodetector but does not comprise its own output amplifier. Pixels 101 are for example pixels with three MOS transistors for one photodetector of the type currently called "3T pixel" in the art or pixels with four MOS transistors for one photodetector of the type currently called "4T pixel" in the art. More generally, the described embodiments are compatible with all known types of pixels.

In the following, it will be considered as a non-limiting embodiment that, in sensor 100 of FIG. 1, the outputs of the pixels of a same column of array 103 are connected to a same conductive track 105 (partially shown in FIG. 1), and that the outputs of the pixels of different columns of array 103 are connected to different output tracks 105. Further, it will be considered in this example that the pixels of sensor 100 are simultaneously controllable by rows, that is, in each pixel row, the control gates of control transistors performing a same function (reset, reading, charge transfer, etc.) are connected to a same conductive track (not shown) receiving a control signal common to all the pixels in the row, and the control gates of pixels belonging to different rows are connected to a different control tracks. In the shown example, sensor 100 comprises a circuit 107 capable of delivering control signals to the different pixel rows of array 103.

Sensor 100 comprises a circuit 130 capable of calculating, in analog mode, one or a plurality of statistical estimators based on output values of the sensor pixels. In the example of FIG. 1, it is provided to divide array 103 into a plurality of blocks or subsets of neighboring pixels and, during the compressive sensing of an image, to calculate one or a plurality of statistical estimators representative of the degree of sparseness of each block. In each block, a compressive sensing of the image portion defined by the block is then implemented, by selecting the compression rate of the block according to the statistical estimators of the block.

In the shown example, given for explanation purposes, array 103 is divided into four array blocks $B_j$ (j being an integer ranging from 1 to 4) of same dimensions, that is, two rows of two blocks of 4×4 pixels each. Block $B_1$ comprises the pixels common to rows R1 to R4 and to columns C1 to C4, block $B_2$ comprises the pixels common to rows R1 to R4 and to columns C5 to C8, block $B_3$ comprises the pixels common to rows R5 to R8 and to columns C1 to C4, and block $B_4$ comprises the pixels common to rows R5 to R8 and to columns C5 to C8.

In this example, circuit 130 is capable of calculating, for each block, the mean of the output values of the pixels in the block, and the variance of the output values of the pixels in the block. It will however be within the abilities of those skilled in the art to adapt the provided architecture to calculate other statistical estimators.

In the shown example, circuit 130 comprises, at the foot of each column of array 103, an analog operator 131 capable of squaring the analog value read from output track 105 of this column. Circuit 130 further comprises an array 133 of switched capacitors, capable of storing a number of analog values read from output tracks 105 of the array of pixels 103 or at the output of operators 131.

In the implementation of a compressive sensing, it is provided in this example to control the reading of the pixels of array 103 row by row, according to a reading mode currently called rolling shutter type in the art.

It is first provided to read from the pixel rows corresponding to a first row of blocks $B_j$ of array 103, that is, rows R1, R2, R3, and R4 in the present example. For each read pixel, the output value of the pixel, as well as the square of this value—calculated by operator 131 associated with the column containing the pixel—are stored in array 133. In this example, array 133 is sized to simultaneously contain the output values of all the pixels of a row of blocks $B_j$, as well as, for each pixel, the square of the output value of the pixel. In the example of FIG. 1, array 133 thus comprises at least (2 blocks)*(4*4 pixels per block)*(2 values per pixel)=64 capacitors. The analog quantities read from output tracks 105 and at the output of operators 131 are, for example, voltages. It will however be within the abilities of those skilled in the art to adapt the described embodiments to the case where other analog values, for example, currents, are read from tracks 105 and/or at the output of operators 131.

Once a row of $B_j$ has been read from, and the corresponding pixel values and squared pixel values have been transferred into array 133, the variance of each of the read blocks is analogically calculated based on the values contained in array 133.

To achieve this, circuit 130 comprises, in addition to the above-mentioned elements, one or a plurality of analog variance calculation operators 135—one operator 135 per block stored in array 133, that is, two operators 135 working in parallel in the example of FIG. 1.

Each operator 135 comprises, in this example, a first analog mean calculation operator 136, which receives from array 133 the output values of the pixels of a block and delivers an analog value representative of the mean of the pixel values of the block, and a second analog mean calculation operator 137, which receives from array 133 the squares of the output values of the pixels in the block, and delivers an analog value representative of the mean of the squares of the pixel values of the block. Each operator 135 further comprises, in this example, an analog operator 138, which receives the output value operator 136 and squares up this value, and an analog subtraction operation 139 which receives the output values of operators 138 and 137 and delivers a value representative of the difference between the output value of operator 137 and the output value of operator 138. The output value of operator 139 is thus representative of the variance of the block, which is equal to the mean of the squares of the values of the pixels in the block minus the square of the mean of the values of the pixels in the block.

In the shown example, sensor 100 comprises an analog-to-digital converter (ADC) 142 at the output of each operator 135 (that is, two converters 142 in the example of FIG. 1), enabling to digitize the analog variance value calculated by the corresponding operator 139.

In the shown example, sensor 100 further comprises an analog-to-digital converter 141 at the output of each operator 135 (that is, two converters 141 in the example of FIG. 1), enabling to digitize the analog mean value calculated by the corresponding operator 136. It should be noted that in the example described hereafter, only the variance is used to determine the compression rate to be applied to each image block. Analog-to-digital converters 141 are thus optional. It may however be advantageous in certain applications to have a plurality of statistical estimators for each block, and particularly the mean, either to determine the compression rate to be applied to the block, or for other reasons.

In the embodiment of FIG. 1, it is provided, for each block, to implement a compressive sensing of the pixel values of the block contained in array 133, by adapting the compression rate of the block according to the variance of the block. As an example, the compression rate may be all the higher as the variance is low, and conversely.

In this example, sensor 100 comprises a digitization stage 190 comprising as many analog-to-digital converters 192 as pixel array 103 comprises columns—that is, eight converters 192 in the shown example. In the case of an acquisition of an entire non-compressed image, converters 192 may be directly connected to column output tracks 105 of array 103, that is, the output values of the pixels are directly stored along the reading, without passing through switched capacitor array 133. In the case of a compressive sensing, converters 192 may be connected to the output of switched capacitor array 133, to digitize analog values stored in array 133. For simplification, the connections between output tracks 105 of array 103 and converters 192 on the one hand, and between array 133 and converters 192 on the other hand, have not been shown.

In the embodiment of FIG. 1, to implement the actual compressive sensing, sensor 100 comprises a circuit 170 for generating pseudo-random binary signals having a variable output expectation. In this example, circuit 170 comprises a generator 172 of pseudo-random binary signals having a fixed output expectation, and an expectation adaptation stage.

In this example, generator 172 comprises a number of pseudo-random outputs equal to the number of columns of pixel array 103, that is, eight outputs $a_k$ (k being an integer ranging from 1 to 8) in the shown example. In this example, as will be explained in further detail in relation with FIG. 2, each output $a_k$ is a 3-bit word $a_k(m)$, m being an integer ranging from 1 to 3. Each bit $a_k(m)$ of each output $a_k$ of generator 172 has a fixed expectation—for example, ½—which means that the probability to have, for a drawing, value $a_k(m)$ equal to binary value '1', is ½.

Each output $a_k$ of generator 172 has an associated expectation adaptation cell $174_k$ which receives the signals generated on output $a_k$ by generator 172 and delivers a pseudo-random signal $a_k'$—a binary signal in this example—having its expectation depending on a control signal received by cell $174_k$. Cells $174_k$ form, together, the expectation adaptation stage of circuit 170. The different cells $174_k$ may be individually controllable.

In the shown example, binary outputs $a_1'$, $a_2'$, $a_3'$, and $a_4'$, respectively $a_5'$, $a_6'$, $a_7'$, and $a_8'$, of circuit 170, are dedicated to the implementation of the compressive sensing of the first block, respectively of the second block, of block row $B_j$ stored in switched capacitor array 133. In this example, the corresponding expectation adaptation cells $174_1$, $174_2$, $174_3$, and $174_4$, respectively $174_5$, $174_6$, $174_7$, and $174_8$, receive a same control signal representative of the variance of the first block, respectively of the second block. As an example, the control signal received by cells $174_1$ to $174_4$, respectively $174_5$ to $174_8$, is the variance of the first block, respectively of the second block, quantized over one or a plurality of bits—for example, over two bits—by the corresponding converter 142.

In the compressive sensing of the image blocks contained in array 133, it may be provided to scan array 133 row by row and, for each row, to read, digitize, and transmit in the compressed image only the values of the pixels having their position in the row coinciding with a '1' in the word of binary values formed by the signals of outputs $a_1'$ to $a_8'$ of circuit 170. For each change of read row in array 133, the output word of circuit 170 may be updated.

Then, it may be provided to read the rows of pixel array 103 corresponding to a second row of blocks $B_j$, that is, rows R5, R6, R7, and R8 in this example, and to store in array 133, for each read pixel, the output value of the pixel, as well as the square of this value. The above-mentioned steps of variance calculation and compressive sensing of the data stored in array 133 may then be repeated, and so on until the entire pixel array 103 has been processed.

Figure 2:
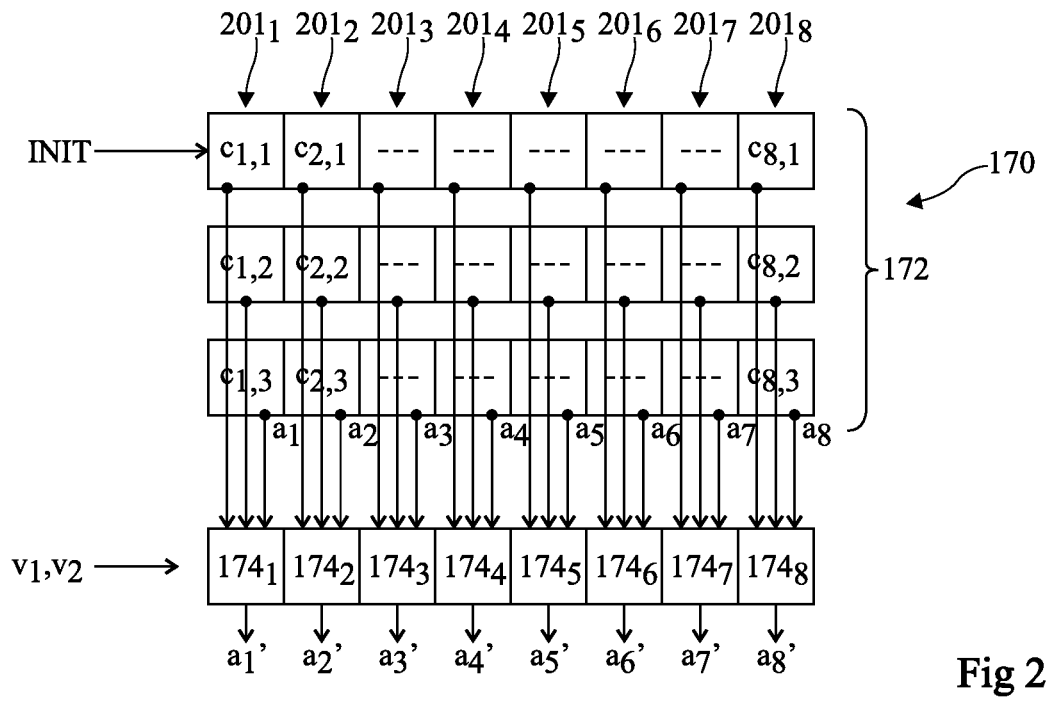
FIG. 2 schematically shows in the form of blocks an embodiment of a pseudo-random binary value generator capable of being used in the sensor of FIG. 1.

FIG. 2 shows in more detailed fashion an embodiment of circuit 170 for generating pseudo-random binary signals having a variable output expectation of FIG. 1.

In this example, pseudo-random generator 172 having a fixed output expectation is a cellular automaton with a chaotic behavior capable of periodically generating eight pseudo-random output words $a_1$ to $a_8$—each output word comprising 3 pseudo-random bits in the present example. Generator 172 comprises a number of shift registers equal to the number of output words to be generated, that is, eight shift registers $201_k$ in the present example. Each shift register $201_k$ comprises a plurality of delay cells, three cells $c_{k,1}$, 1 being an integer ranging from 1 to 3, in the present example. Thus, generator 172 comprises an array of delay cells having three rows of index l and eight columns of index k. The described embodiments are of course not limited to this specific example of sizing of the pseudo-random generator.

On initialization of the automaton, an eight-bit initialization word INIT is loaded into the row of index l=1 of the delay structure.

On each rising or falling edge of a clock signal (not shown), the 8-bit word stored in each row of index l of the array is transferred to the next row of index l+1, except for the word stored in the column of index l=3, which is transferred to outputs $a_1$ to $a_8$ of the array. In the row of index l=1, each cell $c_{k,1}$ (with k ranging from 1 to 8) is updated by a circuit (not shown) implementing a transition function or automaton function of the generator. As an example, the new value of cell $c_{k,1}$ may be based on the values of cells of the row of index l=2, that is, values that cells of the row of index l=1 had at the previous clock edge. As an example, the transition function of the generator may be such that:

$$c_{k,1} = \text{XOR}(\text{OR}(c_{k+1,2}, c_{k,2}), c_{k-1,2}),$$

where XOR designates the XOR logic function and OR designates the OR logic function. The described embodiments are however not limited to this specific transition function.

After a number of updates of the automaton, the 8-bit words at the output of the row of index l of the array has pseudo-random properties. In the case where the above-mentioned transition function is used, the expectation of each delay cell of generator 172 is equal to ½.

In circuit 170, each output $a_k$ of generator 172 is formed by the binary outputs of the three delay cells of the shift register of the column of rank k of the array. Each output $a_k$ of the generator is coupled to an expectation adaptation cell $174_k$. In this example, each cell $174_k$ receives the values stored in the different cells $c_{k,l}$ of shift register $201_k$ of same rank k (that is, 3 values in the example of FIG. 2). More generally, based on the teachings of the example of FIG. 2, it will be within the abilities of those skilled in the art to obtain the desired expectation adaptation effect as soon as each cell $174_k$ receives at least two pseudo-random binary values originating from delay cells of generator 172. In this example, each cell $174_k$ further receives a digital expectation adaptation control word, for example, a two-bit word (v1, v2). Word (v1,v2) for example corresponds to a variance value quantized over two bits by an analog-to-digital converter 142 in the example of FIG. 1. Each cell $174_k$ implements an expectation adaptation function which, on each state switching of the automaton, generates a pseudo-random binary value $a_k'$ from the values that it receives, taking into account the expectation adaptation control word.

The expectation adaptation function is for example such that: $a_k' = c_{k,3}(v1(v2+c_{k,2})+v2c_{k,2}c_{k,1})$, that is:

if (v1,v2)=(0,0), which corresponds to a low variance, $a_k'=0$, which corresponds to a zero output expectation;

if (v1,v2)=(0,1), which corresponds to an average variance, $a_k'=\text{AND3}(c_{k,3}, c_{k,2}, c_{k,1})$, which corresponds to a ⅛ output expectation;

if (v1,v2)=(1,0), which corresponds to a strong variance, $a_k'=\text{AND2}(c_{k,3}, c_{k,2})$, which corresponds to a ¼ output expectation; and if (v1,v2)=(1,1), which corresponds to very strong variance, $a_k'=c_{k,3}$, which corresponds to a ½ output expectation.

The described embodiments are however not limited to this specific expectation adaptation function. It should further be noted that the sensor of FIG. 1 is not limited to the use of a pseudo-random generator of the type described in relation with FIG. 2. It will be within the abilities of those skilled in the art to implement the desired operation while using other types of pseudo-random generators having a controllable output expectation.

An advantage of the embodiments described in relation with FIGS. 1 and 2 is that they enable to perform a compressive sensing of an image divided into blocks, by adjusting the compression rate in each block according to statistical estimators representative of the degree of sparseness of the block, and thus of its ability to be compressed with a limited loss. The compromise between the applied compression rate and the quality of the acquired image can thus be improved.

It should be noted that to be able to reconstruct the original image from the compressed image, the values of the expectation adaptation signals applied to cells $174_k$ in the compressive sensing of the different image blocks should be transmitted in the compressed image, as well as initialization word INIT of generator 172. This enables, on decoding, to generate for a second time the pseudo-random binary values used in the compressive sensing.

According to the envisaged application and to its specific constraints, it will be within the abilities of those skilled in the art to adapt the architecture described in relation with FIGS. 1 and 2, and particularly the statistical estimator calculation circuits. It may in particular be provided to further serialize, respectively to further parallelize, the analog calculations of statistical estimators according to whether it is desired to decrease the quantity of circuits necessary for these calculations, respectively to decrease the image or frame acquisition time.

It should be noted that the described embodiments may be adapted to a so-called 3D architecture, that is, comprising a plurality of stacked circuit levels. In this case, analog calculators of statistical estimators may be partly or totally implemented by analog circuits stacked to the pixel array. This type of architecture enables to save bulk, and may further enable to increase the parallelizing of the operations of pixel reading and of calculation of the statistical or pseudo-statistical estimators. Further, the pseudo-random generator may be formed in a circuit level stacked to the pixel array. This may enable, in certain cases, to have more space to form the pseudo-random generator and accordingly to form a particularly robust pseudo-random generator.

Figure 3:
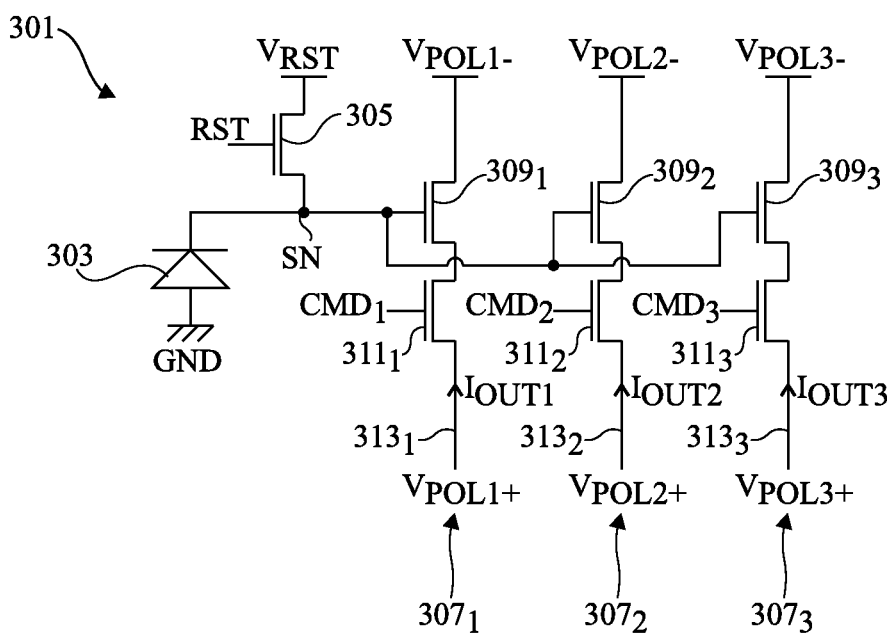
FIG. 3 illustrates in further detail the electric diagram and the operation of an embodiment of a pixel capable of being used in an alternative embodiment of the sensor of FIG. 1.

FIG. 3 illustrates an embodiment of a CMOS pixel 301 capable of being used in an alternative embodiment of the sensor of FIG. 1. Pixel 301 comprises a photodetector 303, a photodiode in this example, a MOS reset transistor 305, and a plurality of read stages, three stages $307_m$, m being an integer ranging from 1 to 3, in the present example, each comprising two MOS transistors $309_m$ and $311_m$. In this example, transistors 305, $309_m$ and $311_m$ are N-channel transistors. The anode of photodiode 303 is connected to a low reference voltage node GND of the sensor, for example, ground, and the cathode of photodiode 303 is connected to a storage node SN of the pixel. Transistor 305 connects node SN to a node of application of a reset voltage $V_{RT}$. In each output stage $307_m$, transistors $309_m$ and $311_m$ connect node SN to an output track $313_m$ of the pixel, which may be common to a plurality of pixels of the sensor. More particularly, in each output stage $307_m$, transistor $309_m$ has its gate connected to node SN, a first conduction node (source or drain according to the applied biasing) connected to a node of application of a bias voltage $V_{POLm-}$, and a second conduction node (drain or source according to the applied biasing) connected to the corresponding output track $313_m$ via transistor $311_m$ or read transistor. In operation, pixel 301 receives control signals RST and $CMD_m$ respectively applied to the gates of transistors 305 and $311_m$.

Thus, pixel 301 enables to simultaneously read an output value of the pixel from a plurality of different output tracks $313_m$. Pixel 301 is for example configured to enable to read the current from output tracks $313_m$. To achieve this, in each read stage $307_m$ of the pixel, output track $313_m$ is coupled to a bias voltage $V_{POLm+}$ greater than voltage $V_{POLm-}$. When the corresponding transistor $311_m$ is in the on state, current $I_{OUTm}$ flowing in output track $313_m$ of the pixel is then representative of the voltage of node SN of the pixel.

The pixel structure of FIG. 3 enables to perform certain calculation operations locally at the pixel level, in current mode. It can thus be provided to decrease the quantity of analog circuits necessary to calculate the statistical estimators outside of the pixel array.

Specific embodiments have been described. Various alterations, modifications, and improvements will readily occur to those skilled in the art.

In particular, provided to make a few adjustments of the sensor which are within the abilities of those skilled in the art, the embodiments described in the present disclosure are compatible with a pixel binning compressive sensing. For this purpose, circuits capable of performing weighted sums of the pixel values of a same image block stored in array 133 may for example be provided downstream of switched capacitor array 133. A pseudo-random generator having a fixed or variable output expectation, having a number of binary outputs equal to the number of pixels of the measurement support used for the compressive sensing (for example, a block $B_j$), may for example be provided. The pseudo-random binary words provided by the generator may be used as weighting coefficients for the compressive sensing measurements. To adjust the compression rate according to the statistical estimators calculated for each block, the number of compressive sensing measurements performed on each measurement support may be varied.

Further, provided to make a few adjustments on the sensor which are within the abilities of those skilled in the art, the above-described embodiments are compatible with a compressive sensing mode where the image is not divided into blocks, and where the statistical estimator(s) are calculated at the scale of the entire image. The compression rate selected according to the statistical estimators may then be the same for the entire image.

Further, in the above-described embodiments, the image blocks used to calculate the statistical estimators may have dimensions and coordinates in the pixel array different from those of the image blocks to which a same compression rate is applied in the actual compressive sensing.

Further, the described embodiments are not limited to the case where the compressed image only contains pixel values or sums of pixel values. In particular, it may be provided to transmit in the compressed image other data which may be non-linear functions of pixel values. It may for example be provided, for each image block $B_j$, to transmit, in addition to the pixel values or pixel sums transmitted during the actual compressive sensing, one or a plurality of statistical estimators (mean, variance, or other) calculated for the block. The inventors have observed that this enables to significantly improve the quality of the reconstructed image, for a relatively limited cost in terms of compression rate. Further, as an example, in sensor 100 of FIG. 1, given that the squares of the pixel values of the blocks are available in switched capacitor array 133, it may be provided to transmit in the compressed image not only compressive sensing measurements (with or without pixel binning) bearing on the block pixel values, but also measurements bearing on the squares of the block pixel values. For example, for each update of the pseudo-random generator used for the compressive sensing measurements, it may be provided to use the same output word of the pseudo-random generator, not only to perform one or a plurality of measurements bearing on the actual pixel output values of the block, but also to perform one or a plurality of measurements bearing on the squares of the pixel output values of the block.

Further, for certain applications, it may be provided to digitize and transmit in the compressed image only the values of the statistical estimators calculated by circuit 130.

It should be noted that when the values transmitted in the compressed image are combinations of output values of a plurality of sensor pixels, images of good quality can advantageously be obtained with pixels of small dimensions.

It should further be noted that the above-described embodiments are not limited to the specific above-mentioned example where the signals for controlling the compression rate applied to each image block are digital signals (variances quantized by analog-to-digital converters 142 in the example of FIG. 1). An analog control of the compression rate may be provided. Further the analog calculations of statistical estimators enabling to determine the compression rate to be applied to each block may be performed either on the current values, or on the voltage values. In the case of a current implementation, the use of pixels from which the current is read, for example of the type described in relation with FIG. 3, will be preferred. In the case of a voltage implementation, the use of pixels from which the voltage is read, for example, with analog processing circuits arranged at the foot of a column such as described in relation with FIG. 1, will be preferred.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A CMOS image sensor comprising:
    a plurality of pixels;
    a first analog circuit for calculating one or a plurality of statistical estimators based on the analog output values of pixels of the sensor; and
    a second circuit capable of implementing a compressive image sensing method, the method comprising acquiring non-coherent output values based on the output values of a pseudo-random selection of one or a plurality of sensor pixels, wherein the applied compression rate is a function of the statistical estimator(s) calculated by the first circuit.

2. The sensor of claim 1, wherein said pixels are distributed into a plurality of blocks of pixels, and wherein the compression rate is adapted block by block according to the statistical estimators calculated by the first circuit.

3. The sensor of claim 2, wherein:
in each block, one or a plurality of statistical estimators based on the output values of the pixels in the block are calculated by the first circuit; and
the compression rate of the block is a function of the statistical estimators calculated for the block.

4. The sensor of claim 1, wherein the second circuit comprises one or a plurality of analog statistical estimator calculation operators.

5. The sensor of claim 1, wherein:
said compressive sensing method is a pixel binning compressive sensing method; and
the compression rate is adjusted by varying the number of compressive sensing measurements performed on each measurement support of the image.

6. The sensor of claim 1, wherein the statistical estimator(s) are selected from the group comprising the mean, the variance, the asymmetry coefficient, the kurtosis, and statistical moments of an order greater than 4.

7. The sensor of claim 1, wherein said pixels are arranged in an array.

8. The sensor of claim 1, wherein the statistical estimator(s) calculated by the first circuit are digitized and transmitted in the compressed image.

9. The sensor of claim 1, wherein the second circuit comprises an array of switched capacitors.

10. The sensor of claim 9, wherein:
said compressive sensing method is a method of compressive sensing with no pixel binning;
the second circuit comprises a circuit for generating pseudo-random binary values having a controllable output expectation; and
the compression rate is adjusted by varying the output expectation of said pseudo-random binary value generation circuit.

11. The sensor of claim 10, wherein the circuit for generating pseudo-random binary values having a controllable output expectation comprises a generator of pseudo-random binary values having a fixed output expectation, and an expectation adaptation stage.

12. The sensor of claim 11, wherein the generator comprises an array of delay cells.

13. The sensor of claim 11, wherein the expectation adaptation stage comprises a plurality of expectation adaptation cells, each receiving a plurality of pseudo-random binary signals having a fixed output expectation delivered by the generator, and implementing an expectation adaptation function which takes into account a control signal representative of one or a plurality of statistical estimators calculated by the first circuit.

14. A CMOS image sensor comprising:
a plurality of pixels;
a first analog circuit for calculating one or a plurality of statistical estimators based on the analog output values of pixels of the sensor;
a second circuit capable of implementing a compressive image sensing method, the method comprising acquiring output values based on the output values of a pseudo-random selection of one or a plurality of sensor pixels, wherein the applied compression rate is a function of the statistical estimator(s) calculated by the first circuit, wherein the second circuit comprises an array of switched capacitors.

15. The sensor of claim 14, wherein:
said compressive sensing method is a method of compressive sensing with no pixel binning;
the second circuit comprises a circuit for generating pseudo-random binary values having a controllable output expectation; and
the compression rate is adjusted by varying the output expectation of said pseudo-random binary value generation circuit.

16. The sensor of claim 15, wherein the circuit for generating pseudo-random binary values having a controllable output expectation comprises a generator of pseudo-random binary values having a fixed output expectation, and an expectation adaptation stage.

17. The sensor of claim 16, wherein the generator comprises an array of delay cells.

18. The sensor of claim 16, wherein the expectation adaptation stage comprises a plurality of expectation adaptation cells, each receiving a plurality of pseudo-random binary signals having a fixed output expectation delivered by the generator, and implementing an expectation adaptation function which takes into account a control signal representative of one or a plurality of statistical estimators calculated by the first circuit.

19. The sensor of claim 18, wherein said control signal is a quantized variance value.

20. The sensor of claim 18, wherein said control signal is a quantized variance value.

* * * * *